(12) United States Patent
Tanabe et al.

(10) Patent No.: US 10,185,640 B2
(45) Date of Patent: Jan. 22, 2019

(54) METHOD TO PROVIDE AN OPTIMIZED USER INTERFACE FOR PRESENTATION OF APPLICATION SERVICE IMPACTING ERRORS

(71) Applicant: Avaya Inc., Santa Clara, CA (US)

(72) Inventors: Jason Tanabe, Ontario (CA); Ron Gagnier, Ontario (CA); Justin Baltazor, Brentwood, CA (US); Marcel Naegelkraemer, Ontario (CA); Tim Rahrer, Ontario (CA); Geoff Baskwill, Ontario (CA); Jason Milley, Ontario (CA)

(73) Assignee: Avaya Inc., Santa Clara, CA (US)

( * ) Notice: Subject to any disclaimer, the term of this patent is extended or adjusted under 35 U.S.C. 154(b) by 131 days.

(21) Appl. No.: 14/681,488

(22) Filed: Apr. 8, 2015

(65) Prior Publication Data
US 2016/0299807 A1    Oct. 13, 2016

(51) Int. Cl.
*G06F 11/00* (2006.01)
*G06F 11/32* (2006.01)
*G06F 11/07* (2006.01)

(52) U.S. Cl.
CPC .......... *G06F 11/32* (2013.01); *G06F 11/0742* (2013.01); *G06F 11/0766* (2013.01)

(58) Field of Classification Search
USPC .......................................................... 714/57
See application file for complete search history.

(56) References Cited

U.S. PATENT DOCUMENTS

| | | | |
|---|---|---|---|
| 7,925,000 B2 | 4/2011 | Mohler | |
| D727,952 S | 4/2015 | Edwards et al. | |
| D746,849 S | 1/2016 | Anzures et al. | |
| D752,604 S | 3/2016 | Zhang | |
| 2004/0230873 A1* | 11/2004 | Ward | H04L 41/12 714/39 |
| 2006/0080571 A1* | 4/2006 | Ichinowatari | G06F 11/328 714/4.1 |
| 2007/0168753 A1* | 7/2007 | Herter | G06F 11/0709 714/42 |
| 2008/0122796 A1 | 5/2008 | Jobs et al. | |
| 2008/0288502 A1* | 11/2008 | Coley | G06F 11/0709 |
| 2009/0106327 A1* | 4/2009 | Dilman | G06F 11/0727 |
| 2010/0005396 A1* | 1/2010 | Nason | G06F 3/1438 715/746 |

(Continued)

OTHER PUBLICATIONS

"Error handling in IBM Worklight adapters," IBM WebSphere Developer Technical Journal, Dec. 5, 2012, retrieved from: <http://www.ibm.com/developerworks/websphere/techjournal/1212_paris/1212_paris.html>, 8 pages.

"FAQ for Lenovo SmartPhone Products", posted at support.lenovo.com, Mar. 24, 2014, [site visited Jun. 2, 2016] retrieved from:<https://support.lenovo.com/us/en/documents/ht077051>, 3 pages.

(Continued)

*Primary Examiner* — Sarai E Butler

(74) *Attorney, Agent, or Firm* — Sheridan Ross P.C.

(57) ABSTRACT

Mechanisms are provided herein which accommodate the handling of multiple service errors on a service exception handling display. In particular, when a single and/or multiple service errors are present, a user interface of the communication device can provide a dynamic exceptions view for simple management and control of the one or more service errors received. The service errors can be resolved independently and a manner most productive with a user while improving user experience.

20 Claims, 9 Drawing Sheets

(56) References Cited

U.S. PATENT DOCUMENTS

| | | |
|---|---|---|
| 2010/0023865 A1 | 1/2010 | Fulker et al. |
| 2010/0313073 A1* | 12/2010 | Leeb .................... G06F 11/0793 714/37 |
| 2010/0332919 A1* | 12/2010 | Ito ........................... G11B 27/11 714/57 |
| 2011/0047135 A1 | 2/2011 | Vizethann et al. |
| 2011/0239059 A1* | 9/2011 | Sugimoto ........... H04N 1/00244 714/57 |
| 2013/0132854 A1 | 5/2013 | Raleigh et al. |
| 2014/0123004 A1 | 5/2014 | Chaudhri et al. |
| 2014/0189574 A1 | 7/2014 | Stallings et al. |
| 2014/0200426 A1 | 7/2014 | Taub et al. |
| 2015/0272546 A1* | 10/2015 | Cheon .................... A61B 8/469 600/408 |
| 2015/0370685 A1* | 12/2015 | Heymann ........... G06F 11/3676 714/38.1 |
| 2016/0048277 A1 | 2/2016 | Scott et al. |
| 2016/0073259 A1 | 3/2016 | Lee et al. |
| 2016/0078642 A1 | 3/2016 | Nigg |
| 2016/0154692 A1* | 6/2016 | Heinz ................. G06F 11/0772 714/2 |
| 2016/0179598 A1* | 6/2016 | Lvin ..................... G06F 11/079 714/48 |

OTHER PUBLICATIONS

"Sentry: Track exceptions with modern error logging for JavaScript, Python, Ruby, Java . . . ," Jul. 5, 2014, retrieved from: <http://web.archive.org/web/20140705063707/https://getsentry.com/welcome>, 3 pages.

Brian, "Tip: Samsung Galaxy S II Android Notification Bar Icon Guide", posted at http://careace.net, Dec. 20, 2011, [site visited Jun. 2, 2016] retrieved from: <http://careace.net/2011/12/20/tip-samsung-galaxy-s-ii-android-notification-bar-icon-guide>, 3 pages.

Perez, "Mixbook Reveals Mosaic: An Easy-To-Use App for Making Photo Books From Your iPhone," posted at techcrunch.com, Oct. 22, 2012, [site visited Jun. 2, 2016] retrieved from:<http://techcrunch.com/2012/10/22/ mixbook-reveals-mosaic-an-easy-to-use-app-for-making-photo-books-from-your-iphone>, 2 pages.

Stone, "Answer a Phone Call With a Shake of Your Head: Exciting New iOS7 Features", posted at lifelabs.ucp.org, Jun. 27, 2013, [site visited Jun. 2, 2016] retrieved from:<http://lifelabs.ucp.org/answer-a-phone-call-with-a-shake-of-your- head-exciting-new-ios 7-features>, 1 page.

Notice of Allowance for U.S. Appl. No. 29/526,373, dated Jul. 7, 2016, 9 pages.

U.S. Appl. No. 29/526,373, filed May 8, 2015, Tanabe et al.

* cited by examiner

800

| Error 816 | Service Type 820 | EXCEPTIONS 844<br>Solution 824 | |
|---|---|---|---|
| 812 | | | •••• |
| 1. Certificate Problem | Client Enablement Services | • Install server certificate<br>• Verify correct CA certificate<br>• Check for expired certificate | |
| 2. Login Error | | • Verify Correct Password<br>• Reset password | ••• |
| 1. VoIP Login Error | Voice over IP | • Verify Correct Password<br>• Reset password | |
| 1. Visual Voicemail Unavailable | Voicemail | | •••• |

*Fig. 8*

METHOD TO PROVIDE AN OPTIMIZED USER INTERFACE FOR PRESENTATION OF APPLICATION SERVICE IMPACTING ERRORS

FIELD OF THE DISCLOSURE

The present disclosure is generally directed toward communication devices and software applications running on a desktop, laptop, or mobile devices and more specifically toward handling one or more service errors or service impacting notifications through a user interface on the communication device.

BACKGROUND

As communication devices are becoming more ubiquitous and consumers are constantly connecting and interacting with other devices, and many different services, the potential for errors are also becoming more frequent, varied, and prominent. Error messages stemming from the inability to connect, network issues, software issues, configuration issues, and operational issues as just a few of the errors that devices are now more prone to receive. Typically these error messages are presented to a consumer through pop-up messages during the operation of the device. However, as devices are evolving and communication and processing is becoming more complex, error messages are becoming more frequent. Given the wide diversity of problems and sources of problems, there is a need for a clear presentation model that is optimized for multi-service applications.

For example, a typical error alert appears with a "Security Certificate Error," the error alert provides two options "Dismiss" or "Settings." The user stops and addresses the issue: 1) it dismisses the popup and the error notification is gone or 2) proceeds to the settings screen to resolve the error.

A number of issues are arising form this scenario. One such issue is distraction and annoyance faced by the user in needing to attend to the error at that instant it occurs, even if the error does not need immediate resolution. This is especially true, when multiple errors are occurring and the user efficiency is jeopardized by the numerous alerts. In addition, in many cases a common root cause like a network interruption may cause similar errors within many services within a multi-service application leading to numerous unwanted alerts. Another issue is inability to quickly retrieve a previous error dismissed, at a time more convenient for the user. Still another issue is the limiting error display, where receiving a single pop-up for error for every error can be messy, inefficient, and difficult to navigate.

SUMMARY

Embodiments of the present disclosure proposed herein provide one or mores mechanisms to create and display multiple service exceptions in an error handling area. The handling area can provide an easy-to-use display for one or multiple errors. In some embodiments, the handling area provides a dynamic view on the communication device allowing the user to respond to one or more service errors. In other embodiments, the handling area presents a user with one or more service errors from a single service. In other embodiments, the handling area optimizes the service errors such that the service errors are structured, consolidated and prioritized. Still in other embodiments, the handling area presents the user with multiple errors associated with various services.

In accordance with at least some embodiments of the present invention, a method provided that generally comprises: receiving one or more service errors;
  displaying a service error notification of the one or more service errors on a user interface;
  displaying, by the user interface, an exceptions handling area, wherein the exceptions handling area lists the one or more service errors received; and
  receiving a user input selecting the service error for resolution.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

The terms "determine", "calculate", and "compute," and variations thereof, as used herein, are used interchangeably and include any type of methodology, process, mathematical operation or technique.

The term "service" and various thereof, are used herein refers to features or functions enabled by external servers/computers that can be performed at a communication device as long as that communication device is appropriately connected to the server/computer enabling part or all of the service. For instance, voicemail can be a service completely provided by an external voicemail server, completely maintained on the communication device, or enabled by a combination of the two.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

BRIEF DESCRIPTION OF THE DRAWINGS

The present disclosure is described in conjunction with the appended figures, which are not necessarily drawn to scale:

FIG. 8 depicts a data structure for storing service errors and corresponding solutions.

DETAILED DESCRIPTION

The ensuing description provides embodiments only, and it is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

While embodiments of the present disclosure will be primarily described in connection with a user interface on a communication device, it should be appreciated that embodiments of the present disclosure are not so limited.

Various aspects of the present disclosure will be described herein with reference to drawings that are schematic illustrations of idealized configurations. It should be appreciated that while particular user interface arrangements and configurations are described herein, embodiments of the present disclosure are not limited to the illustrative display configurations and/or user interface depictions and descriptions. Specifically, it should be appreciated that features, functions and various views may be replaced or added to achieve a similar function without departing from the scope of the present disclosure.

Presented herein are embodiments of a system and method that solve the drawbacks associated with receiving multiple service errors, for example from multiple services. The embodiments may relate to a communication device, such as a wireless communication device, a wired communication device, or the like. The communication device can include a connection, communication, and association between two or more networks or network devices. The overall design and functionality of the system described herein is, as one example, to provide a more efficient means for a device to present and manage service errors using a user interface for display of the errors on an error handling area.

Embodiments provide, among other things, a novel mechanism that facilitates a simple and efficient process for managing one or more service errors from one or more services. The embodiments generally reduce or remove the need for a user to stop and deal with error pop-ups from multiple services, most of which do not require immediate attention. As a result, a better user experience is achieved by minimizing interruptions and providing a single location for error management and control. Other advantages exist as will be discussed herein.

Figure 1:
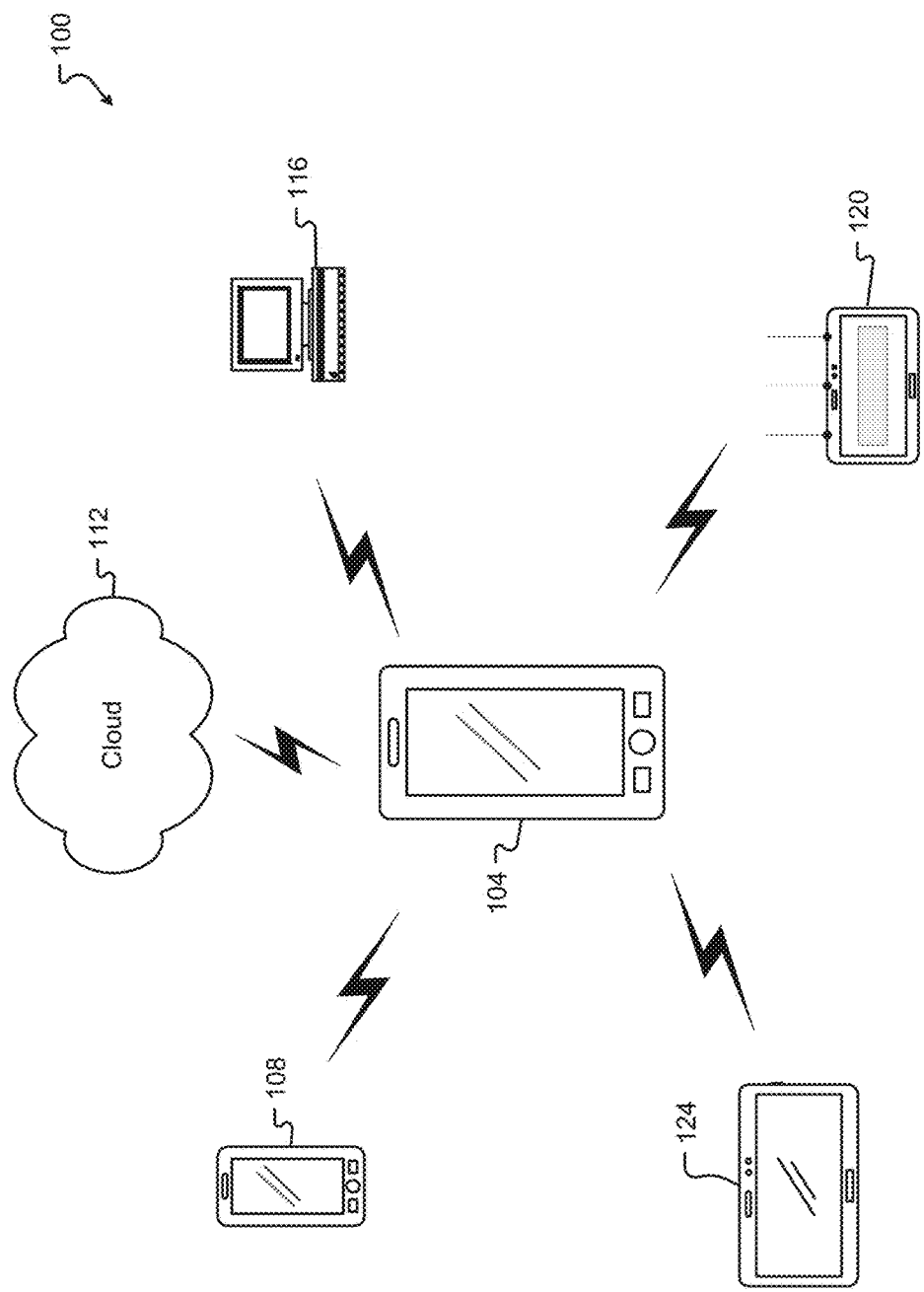
FIG. 1 depicts a communication environment.

A general communication environment 100 is shown in FIG. 1. The communication environment 100 can include communication between various wired and wireless communication devices and/or systems. Communication devices 104 and/or systems can include other wireless communication devices 108, tablets 124, servers 116, routers 120, clouds 112, etc. The communication devices 104 are configured to perform numerous operations and process various tasks at any given time. Often, the processes include data transfer between devices for talk, text, video streaming, web searching, internetworking, etc. However, in communicating with other devices or while processing other tasks, a communication device 104 may encounter errors which need to be addressed by a user. In some instances, more than one error may appear and often the errors may not need immediate resolution. As described below, an exception management module will be presented as well as other embodiments for a better error handling.

Figure 2:
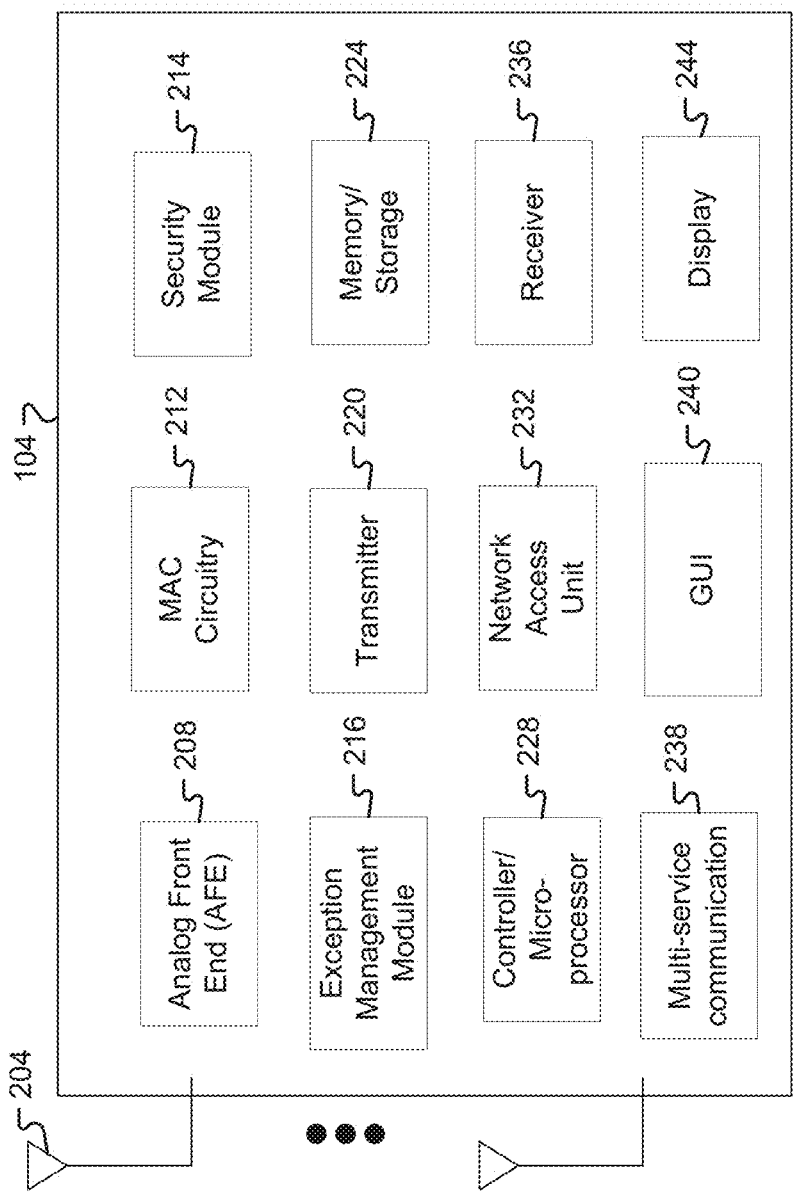
FIG. 2 depicts a communication device.

An example of a communication device architecture is shown in FIG. 2. The communication device 104 can comprise circuitry and/or software that conduct various operations. The operations can include, but are not limited to, conducting calls, synchronizing with other devices, opening multiple applications, presenting information through audio and/or video means, taking pictures, handling errors, etc. The communication device 104 can be any type of computing system operable to conduct any type of operation described herein. As an example, the communication device 104 can be a mobile phone, smartphone, cellular phone, tablet, laptop, Personal Computer, or the like which includes or interacts with various modules and components 204-244 as shown in FIG. 2.

The communication device 104 can have one or more antennae 204 used in signal transmission. The signal transmission can include communications such as multi-input multi-output (MIMO) communications, Bluetooth®, Device to Device (D2D) communications, NFC, etc. The antennas 204 can include, but are not limited to directional antennas, omnidirectional antennas, monopoles, patch antennas, loop antennas, microstrip antennas, dipoles, and any other antenna suitable for communication transmission. Although not depicted, the communication device 104 may also include wired communication interfaces. For instance, the communication device 104 may include an Ethernet interface, a USB interface, an RS 232 interface, or the like.

The communication device architecture includes a transmitter 220 and receiver 236 which are use for data transmission and reception between one or more communication devices 104, using the one or more antennas 204 and/or wired interfaces. When the signal is received at the antenna, the signal will generally progress to the Analog Front End (AFE) 208. In some instances, the A/D is part of the AFE 208.

Included in the communication device architecture is also a controller/microprocessor 228 and memory/storage 224. These components are commonly known in the art and are configured to perform those functions as known and understood by those skilled in the art. For example, the controller/microprocessor 228 is used for processing the digital data from the AFE 208 and can include Application Specific Integrated Circuits (ASICs), digital signal processors, controllers, logic circuits, gate arrays, specific purpose computers, and the like. The memory/storage 224 is used store and retrieve instructions in connection with the controller/microprocessor 228 and can include temporary or long term storage as well as RAM, ROM, DRAM, SDRAM, and other storage devices and media.

The MAC circuitry 212 and Network Access Unit 232 are other modules located within the architecture of the communication device 104. The Network Access Unit 232 can work as a medium used for connectivity between devices and can work in conjunction with at least the MAC circuitry 212. The MAC circuitry 212 can be arranged to contend for a wireless medium and can aid in configuring the packets and frames that will be transmitted over the communication medium.

The communication architecture can also contain a security module 214. The security module can contain information including but not limited to network parameters, WEP and WPA security access keys, network keys, and other codes needed to communicate and access the networks communicating with the communication device 104.

For error handling, as mentioned above, the communication device can contain a display 244, a Graphical User Interface (GUI) module 240 and an Exceptions Management module 216. The GUI module 240 is a module that can be used for managing, manipulating and/or controlling the user interface presented below and in conjunction with FIGS. 3-9. In particular, the GUI module 240 may be configured to automatically adapt properties of the user interface when it is determined that one or more service errors are received at the communication device. The GUI module 240 can also work in conjunction with or independently from the Exceptions Management module 216. The Exceptions Management module 216 is a module that can work in conjunction with the controller/microprocessor 228 and memory/storage 224 to manage, store and retrieve the various service errors received at the communication device 104. The Exceptions Management module 216 enables a clean display of errors stemming from multiple external services along with potential internal errors.

The Exceptions Management module 216 can further interact with a Multi-service Communication module 238. The Multi-service Communication module 238 is a module that leverages multiple services, which are external to the communication device. If errors stem from an external source, the Multi-service communication module can communication with the Exceptions Management module 216 to adequately display, in a useful way, the service errors received both internal to the communication device as well as those received at external devices which are communicating and have been authenticated.

The modules described and others known in the art can be used with the communication device 104 and can be configured to perform the operations described herein and in conjunction with FIG. 1 and FIGS. 3-9.

Figure 3:
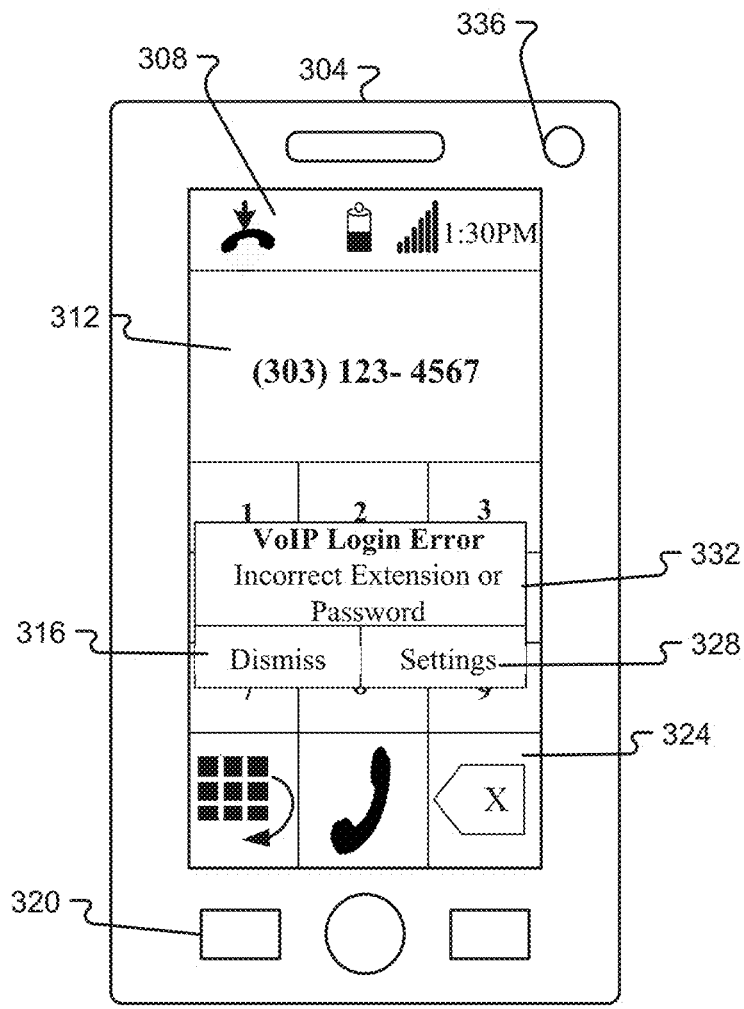
FIG. 3 depicts a communication device with a service error notification.
Figure 4:
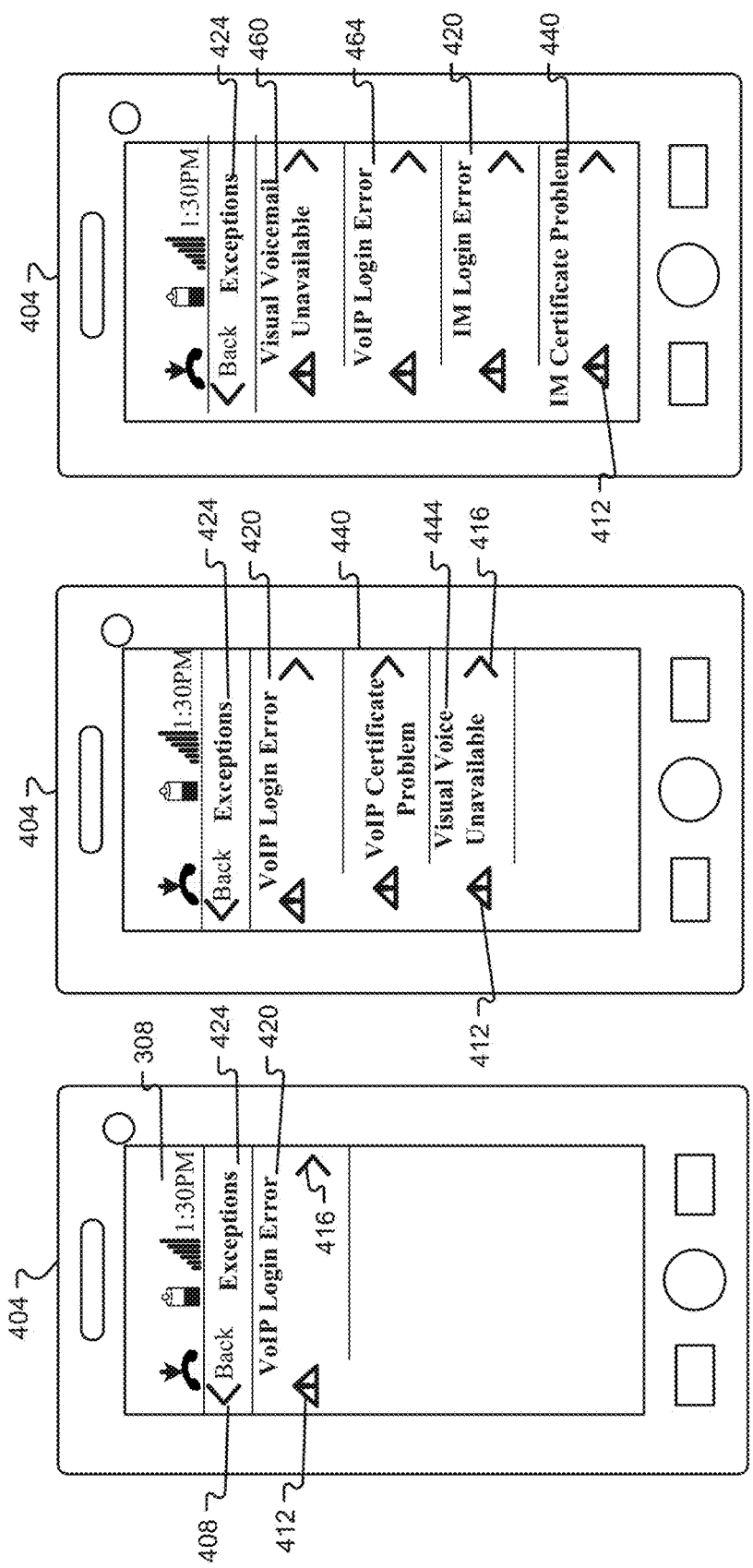
FIG. 4A depicts an exceptions handling area with a service error.
FIG. 4B depicts an exceptions handling area with multiple service errors from a single service.
FIG. 4C depicts an exceptions handling area with multiple service errors for multiple services.

FIG. 3 illustrates a communication device in call view 304. Specifically, FIG. 3 is an embodiment of a communication device 104 with a service error notification 332. The communication device 104 in call view 304 includes the standard dialing display 312, dialing pad 324, home area 320, top bar 308, camera 336, etc. The call view 304 is a graphical user interface (GUI) that presents a user with a graphical means for interacting with the communication device 104. A communication device 104 in call view 304 can use the user interface to at least make and/or receive a phone call.

In some embodiments a user will encounter a service error notification 332 which must be resolved prior to proceeding with the current task and/or communication device 104 interaction. The service error notification 332 can appear as an audible and/or visual pop-up/notification while the user is using the communication device 104. The service error notification 332 will have the title of the error, a dismiss 316 option to ignore, and a settings 328 option. The settings option 328, when selected can take a user to the settings location within the communication device 104 where the error can be corrected. This type of pop-up notification may require immediate user response if the service error is such that it requires resolution before continuing with the task at hand. For example, if a user is making phone call, using a voice over Internet Protocol (VoIP) system such as a captive enterprise communication system, an external device, or Internet based service such as Skype®, or Google Talk, and an incorrect VoIP password is selected/used, the service error notification will appear and user needs to correct the password before continuing with the call. The service error notification reports errors from multiple sources and enables a clean resolution of all the errors without having to go into each application from where the error originated.

Alternatively, if the error is one that does not require immediate attention, the dismiss 316 option may correspond to the only option that is depicted and/or may correspond to a valid selectable input from the user. However, in this situation or in situations where multiple errors are present, a means for retrieving and accessing pending errors may be desirable. FIGS. 4A-4C provide an embodiment for presenting a user with a display of pending service errors. Specifically, a mechanism is presented for single and/or multiple service exceptions handling. The mechanism includes the use of a dynamic exceptions handling area on the communication device 104 that allows a user to see and easily respond to the one or more service errors. The handling area can provide an easy-to-use display for one or multiple errors. The handling area can provide a dynamic view on the communication device allowing the user to respond to one or more service errors. In addition, the handling area can present a user with one or more service errors from a single service. Also, the handling area can optimize the service errors such that the service errors are structured, consolidated and prioritized as well as present the user with multiple errors associated with various services.

FIG. 4A is an illustrative embodiment of an exceptions handling area 404 with a service error notification. In this embodiment, a new user interface is presented with a listing of the current service error 420. The current service error 420 can be an error that requires immediate user attention (i.e. like the error appearing in a pop-up notification and illustrated in conjunction with FIG. 3) or an error that has occurred but may be dealt with at a later time. In the display of the handling area, the title of the interface can appear, i.e., Exceptions 424, as well as a Back 408 option, for returning to the previous screen before entering the handling area.

In the exceptions handling area 404 with a service error notification, the listing of the current service error 420 can be accompanied by an error icon 412 representing the error. The error icon 412 can appear next to the error, on other parts of the exceptions handling area, or even on the top_bar 308. A forward arrow 416 can also accompany the current service error 420 which, when selected presents the screen where the error can be resolved. For example, if the current service error 420 is a login error, selecting the forward arrow 416 can bring up the application where the password can be typed or reset. Note, that in some instances, the current service error 420 area, error icon 412, other locations and/or icons within the exceptions handling area 404 can be selected for error correction routing.

FIG. 4B is an illustrative embodiment of a user interface for service error application handling illustrated as an exceptions handling area 404 with multiple service errors from a single service. The exceptions handling area 404 like in FIG. 4A, contains the service errors 420, 440, 444, Exceptions 424 handling title, error icons 412, Back 408 option, and forward arrow 416. The forward arrow 416 when selected takes the user to the location where the error can be corrected. Alternatively, any area within the listing of the service error, including the error icon 412, can be selected which will redirect the user to the location where the error can be corrected.

In the current embodiment, the exceptions handling area 404 provides the user with ability to manage and control multiple service errors in the order and at a time most convenient to the user. The ability to provide the user with control and error management, not only removes multiple pop-ups, but eliminates the general nuisance associated with getting the pop-ups, thus improving overall user experience. Also, this exceptions handling area 404 provides the user with the flexibility to continue working until the user has time and is ready to solve the service errors encountered by the communication device 104. Further, the exceptions handling area provides a unified view for presenting service errors that can even provide the ability to manage and view only those errors from a specific service of interest. That is, with the presentation of the exceptions handling area 404, filters can be enabled by the user, on the communication device 104, or through other means, so that only service errors from a specific service are presented. For example, FIG. 4B provides a listing of the receipt of multiple service errors from a single service, such as Login Errors and Certificate Problems. The exceptions handling area 404 can alternatively display the service errors as stacked or cascade windows.

In other embodiments, the exceptions handling area with multiple service errors for multiple services is available as illustrated in FIG. 4C. This embodiment presents an extension of the exceptions handling area 404 presented in conjunction with FIGS. 4A and 4B, where a listing of current service errors are presented to a user in a single, unified location or view for better user experience, management, and control. FIG. 4C provides a user interface where the user can manipulate various service errors received at the communication device 104 from various services, as a multi-service view. As an example, Visual Voicemail 460, VoIP Login 464, and Instant Messaging (IM) errors 420,440 can all appear within the exceptions handling area 404. As part of the management and control features associated with this embodiment filters can also be enabled in this view such that only those errors from services of interest to the user are displayed. The types of filters that can be set include, without limitation, receipt date or service error date, service type, importance or designated priority, action required, device impact, etc. The presentation of errors in the list can also be optimized by removing duplicate errors that may occur in cases where the same error is signaled to the device multiple times. The presentation of errors can also be prioritized where only a root cause error is shown to simplify the error mitigation by the user. For example, if there is a network problem that prevents login to several services, only the network error is shown and once mitigated will resolve the login problems automatically. Further, as detailed above, action on the errors can be taken by user input on the forward arrow 416, error icon 412, on within the area associated with the listing of the error itself.

Figure 5:
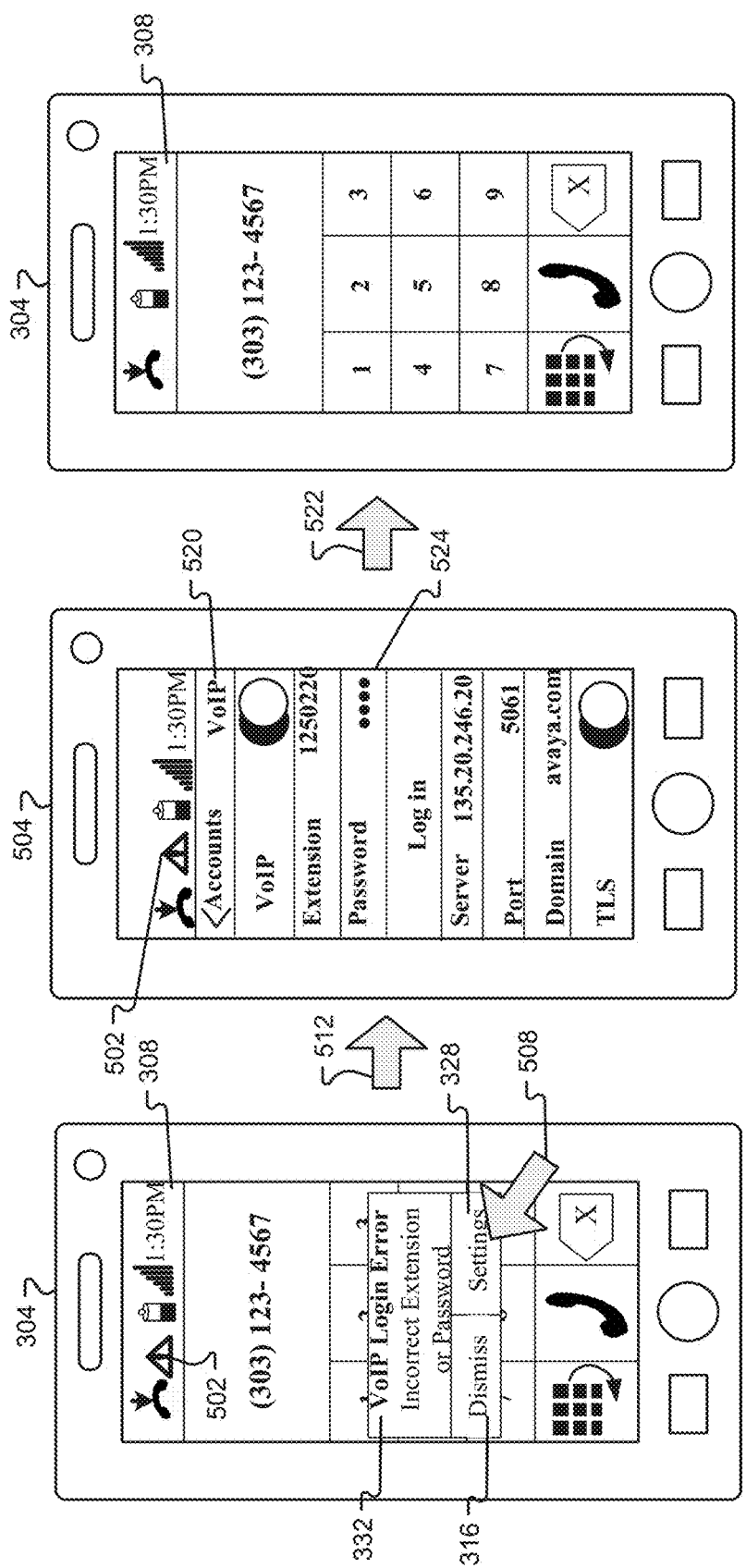
FIG. 5 depicts an illustrative handling of a service error notification.

An illustrative embodiment for handling service error notifications and correcting service errors is illustrated in FIG. 5. Although this is one illustrative embodiment, other forms of handling service error notifications may exist. FIG. 5 is simply an example of how a user who is presented with a service error notification can approach and correct the error. As an example, a user can be presented with a service error notification 332 that takes the form of a pop-up. As described above and in conjunction with FIG. 3, this type of notification can occur while the user of the communication device 104 is in call view 304. The service error notification 332 describes the error, i.e. VoIP Login Error, provides a dismiss 316 option, and provides a settings 328 option. The settings 328 option can vary and can be combined with other options depending on the error received. In addition, the call view 304 can contain an error notification icon 502 on the top bar 308 which will indicate to the user that a service error exists, even in the instance where the user dismisses the service error notification 332.

If a user is prepared to handle the error, or the error is one that needs attention before the user can continue, the settings 328 option can be selected 508. By selecting the settings option 328, the user will be redirected 512 to an appropriate user interface where the error can be resolved or resolution of the problem can at least begin. In one instance, where the service error is a VoIP Login error, the user will be presented with a VoIP settings view 504. The VoIP settings view 504 is identified by the VoIP title 520, and contains relevant VoIP fields, including, but not limited to, radio buttons for enabling VoIP and Transport Layer Security (TLS) capabilities, extensions, passwords, server information, port numbers, domain names, etc. In the VoIP settings view 504 the user is able to reset or input a correct password 524 to correct the VoIP Login error encountered at the call view 304. A feature that remains enabled during the service error resolution, is the display of the error notification icon 502, which continues to notify the user that an error continues to exist. However, once the error is resolved and assuming that only one service error existed, the error notification icon 502 will disappear from the top bar 308 as the communication device 104 transitions back 522 to the call view 304. In some cases an error may resolve itself without user intervention and the error notification icon 502 will disappear if there are no additional errors.

Figure 6:
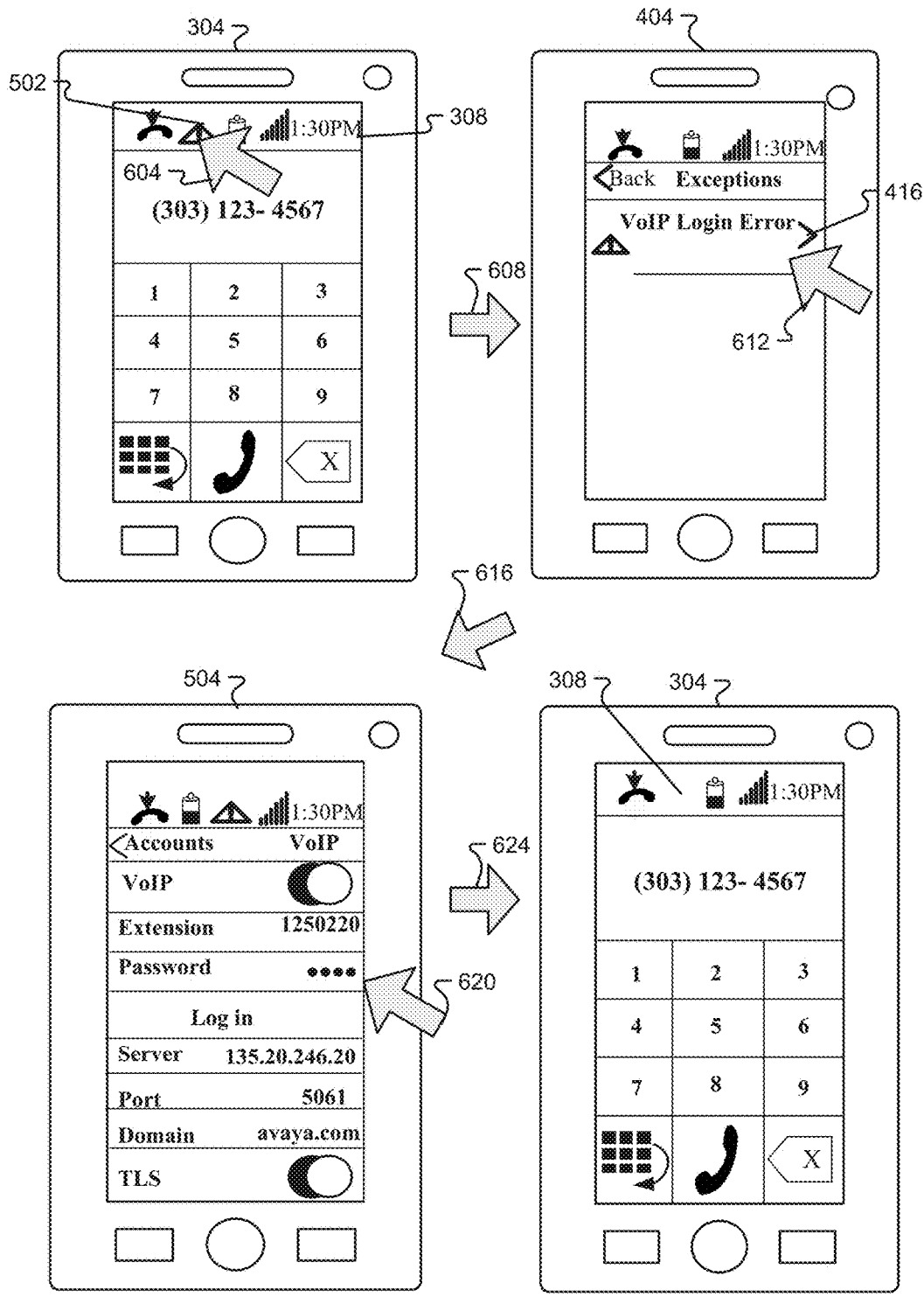
FIG. 6 depicts a secondary illustrative handling of a service error notification.

An alternate or additional embodiment for handling service errors notifications and correcting service errors is illustrated in FIG. 6. In some instances, a user may encounter situations where service errors may exist that do not require immediate attention or more than one service error is present. In such situation, a user has the option to control when to resolve the errors encountered. FIG. 6 illustrates an example where a user executes the option to address a service error while in call view 304. A user is alerted of the service error via the error notification icon 502 located on the top bar 308. The user wishing to manage the errors can initiate the process by input 604 on the error notification icon 502. By selecting the error notification icon 502, the communication device 104 redirects 608 user to the exceptions handling area 404 where the user can select and manage what errors to address. For example, the user at the exceptions handling area 404 may encounter only one error, i.e. VoIP Login Error. The VoIP Login Error is selected either by selecting 612 the area where the error is listed or by specifically selecting the forward arrow 416 within the listing of the service error. The user is then again redirected 616 to the user interface (i.e. VoIP view 504) where a solution can be obtained. At the appropriate view, the user can correct the problem by resetting or inputting the correct password 620. Additionally or alternatively, if the first solution does not resolve the error, the communication device 104 can proceed to the new view as a second solution, like an Accounts and Services view, where the password can be reset. In some instances, the solution presented is simply an alternate to the first solution. In other instances, the second solution is an escalated solution to the first. The input corrects the problem and the communication device returns 624 to the call view, where the user was last working. As was the case in the current example, the error notification icon 502 is no longer present on the top bar 308. However, the error notification icon 502 can persist if other errors exist. Additionally or alternatively, if other service errors exist, instead of the last view, a user can be present with the exceptions handling area 404 so as to provide the user with the opportunity to decide if he/she wants to continue correcting other errors that may exist in the system or within the communication device 104.

Figure 7:
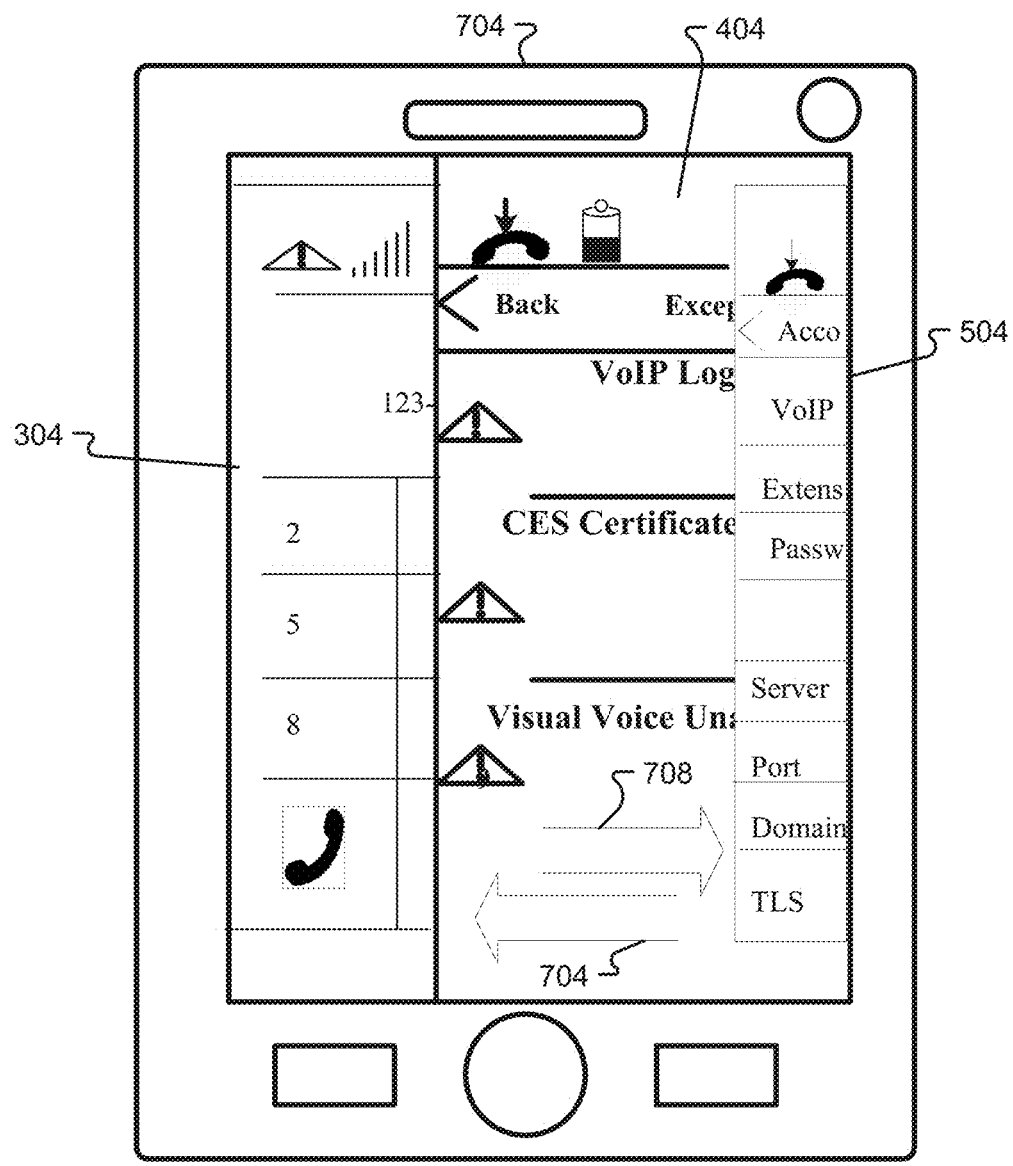
FIG. 7 depicts screen transitioning for handling service errors.

FIG. 7 depicts an illustrative embodiment of the transition between screens for handling service errors. As described above and in conjunction with FIGS. 5-6, there are various options available for accessing and handling service errors. As the errors are handled, a transition between windows occurs. FIG. 7 exemplifies one possible scenario where the windows transition in a carousel like manner. As seen in the figure, a communication device 104 operating on a call view 304 can transition into the exceptions handling area 404 and onto a settings view 504. The transition can occur with a swipe like gesture on the display screen of the communication device 104. The swipe can occur from left to right 708 or right to left 704 as to display the various views 304, 404 and 504. As the swipe gesture continues, the screens make full circle as in a rolodex. The gesture on the display screen is not limited to a swipe gesture, the gesture can also include but is not limited to a tap, a pinch, a drag, etc.

In addition, the screens can transition in a sliding manner such as a drawer or pop-up manner. Further, the screens can also be presented in a stack, cascade or even side-by-side manner. For example, in the cascade manner, the windows/screens are organized and opened in a visible and accessible manner such that the windows lie on top of each other. Screens arranged and transitioning in a stack manner would simply be organized in a manner where the windows open and are arranged on top of each other. In either arrangement, a tap or swipe would provide access between the windows.

FIG. 8 depicts a data structure 800 for storing service errors and corresponding solutions. The data structure 800 can include one or more data files or data objects 816, 820, and 824. Thus, the data structure 800 can represent different types of databases or data storage, for example, object-oriented databases, flat file data structures, relational databases, or other types of data storage arrangements. Embodiments of the data structure 800 disclosed herein may be separated, combined, and/or distributed. There may be fewer or more files as represented by the ellipses 840 and 844.

The current configuration of the data structure 800, is configured like a table where row 808 provides the title of the data structure (i.e. Exceptions), data file titles/categories are designated within row 812 and the various records associated with the data files follow below as records 828-836. Each communication device 104 can encounter various errors as it is operating and/or communicating with one or more devices or services. The errors encountered are maintained in Error data file 816, a listing of some of the errors are illustrated in FIG. 8. For example a first portion 828 can include those errors associated with client enablement services, i.e., Certificate Problem, Login Error, etc. A listing of the errors associated with client enablement service would reside within the Error data file 816 in portion 828. A corresponding Service Type data file 820 would categorize the errors by service and solutions for the corresponding service error would lie within the repository under the Solutions data file 824. Under the Solutions data file, a listing of the one or more solutions available for the error would be documented such that the communication device is able to retrieve the solution and route the device through the one or more steps. In addition, escalating steps or recovery steps are stored within the solution portion 824. For example, if the exceptions handling area identifies a Certificate Error, data structure 800 is called and solutions including installation of a server certificate, verification of a correct CA certificate, and verification of certificate expiration date are presented. Therefore, a user selecting a Certificate Error for correction would be guided to first verify the expiration date, if that solution does not work, the user can be presented with the option to install a new server certificate, and the process would continue as the user troubleshoots and obtains a solution. The steps and solutions presented are illustrative and other solutions in another order or configuration can exist. The data structure 800 can also include other Error data files 816 identifying errors associated with other service types such as VoIP errors 832 and Visual Voicemail errors 836. As indicated above other services, errors, and data files can exist as represented by the ellipses 844 and 840. In addition, the data structure can be used in optional filtering available for displaying service errors on the error handling area. For example, filters may be provided such that the service errors presented are for example, but not limited to only errors that require immediate attention, errors from a specified service, errors received based on a date range, errors associated with certain functions, etc.

Figure 9:
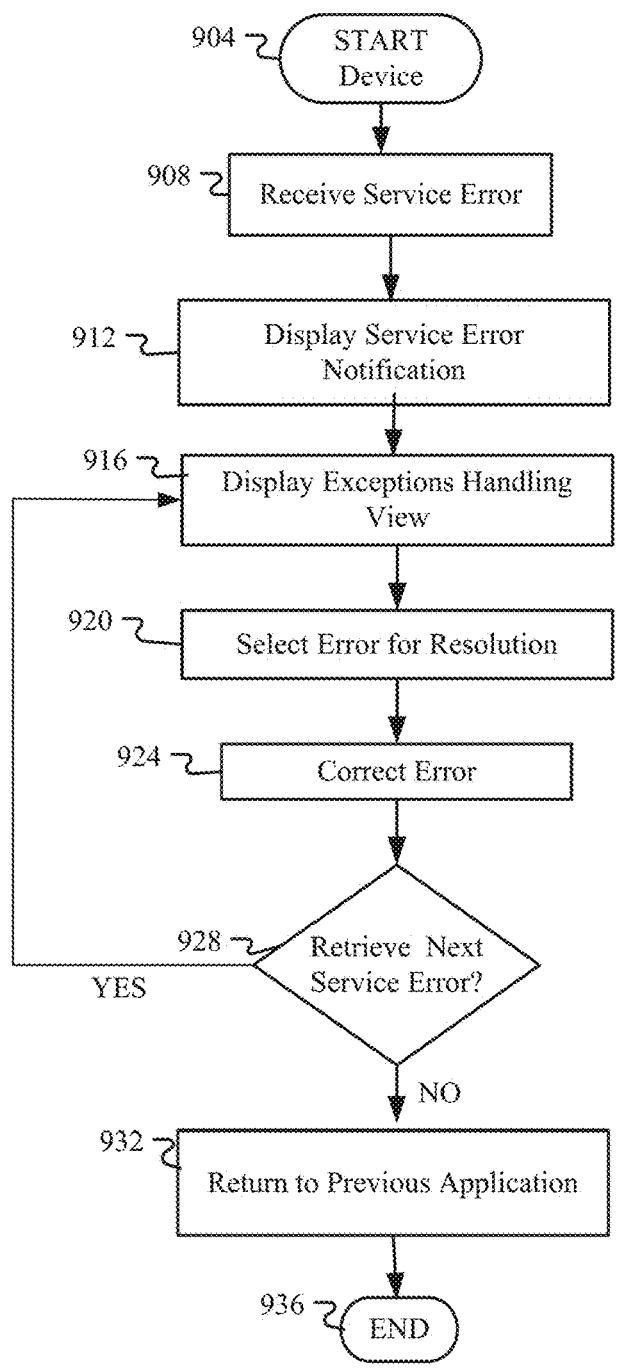
FIG. 9 depicts a flowchart illustrating error handling using an exceptions handling area.

FIG. 9 outlines an illustrative flowchart illustrating error handling using an exceptions handling area. In particular, execution of error handling begins at step 904 and continues to step 908. In step 908 a communication device 104 receives at least one service error. The service error can come from one or more services such as but not limited to VoIP, IM, Directory Search, CES, and Voicemail. The service error received by the communication device 104 triggers a display of a service error notification at step 912. The service error notification can come from a service error pop-up like the one described and illustrated in conjunction with FIGS. 3 and 5. Such service error notifications can occur when only one service error exists and/or when immediate error correction is required. In addition, or alternatively, a service error notification can come in the form of an error notification icon on the top bar of the display screen of the communication device as described above and in conjunction with FIGS. 5 and 6.

The process continues to step 912, where a user has the option of retrieving the service error received. The service errors received are presented in an exceptions handling area in step 916. The exceptions handling area, as described above, can be accessed via input on the service error notification and/or the error notification icon. The handling area can enable error handling for services on the communication device as well as services different from the native applications which can require communication with external devices. The error handling can be enabled to handle service errors from external devices through authentication and/or handshake protocol.

The exceptions handling area provides a display of the current error(s). The errors can be one or more, from one service, from multiple services, or from specified services. The exceptions handling view further provides the option to select the desired error to handle in step 920. In selecting the error to handle, the process in step 924 will continue to a display where error can be corrected. The process can take one or more steps where a first window provides an initial solution that can remedy the problem. If however, the error requires several steps or the initial solution does not remedy the problem, then other windows and related interfaces can be presented for error resolution.

Upon correcting the error at step 924, the process can continue and the option to retrieve the next service error exists in step 928. If no error exists or if no further error trouble shooting or correction is desired, the process continues to step 932 where the communication device is return to the previous application. Alternatively, if the option is to continue to retrieve the next error, the communication device returns to the exceptions handling area in step 916 where the next error can be selected and corrected back at steps 920 and 924 respectively. The process continues until the previous application is in view in step 932 and the process ends at step 936.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed:

1. A communication device, comprising:
   a user interface;
   a processor; and
   a computer memory comprising one or more instructions that, when executed by the processor, cause the processor to:
   receive a plurality of service errors impacting the operation of the communication device;
   display a service error notification of the plurality of service errors on the user interface;
   display an exceptions handling area, wherein the exceptions handling area lists the plurality of service errors received in priority order; and
   receive user input selecting the service error for resolution; and
   wherein the priority order is determined by at least one of service type or solution.

2. The communication device of claim 1, wherein the service error notification comprises an error notification icon located on a top bar of the user interface.

3. The communication device of claim 1, wherein the service error notification comprises a pop-up.

4. The communication device of claim 3, wherein if the pop-up is dismissed, the service error can be later retrieved using the error notification icon on the top bar of the user interface.

5. The communication device of claim 1, wherein the exceptions handling area presents the plurality of service errors based on a single service or a multi-service view, wherein the multi-service view displays the plurality of service errors from two or more services, and wherein the multi-service view displays a top-most view.

6. The communication device of claim 3, wherein the exceptions handling area can further include a filter where the plurality of service errors are presented based at least on one or more of a service error date, a service type, or wireless device impact.

7. The communication device of claim 5, wherein at least one of the plurality of service errors share a root cause and the multi-service view displays a single consolidated service error of the root cause.

8. The communication device of claim 5, wherein the second solution presented is an escalated solution as compared to the first solution.

9. The communication device of claim 5, wherein the solutions presented and recovery steps are stored in a data structure within the computer memory.

10. The communication device of claim 1, wherein in retrieving the plurality of service errors corresponds to transitioning between a current window view, an exceptions handling area, and a settings view.

11. The communication device of claim 8, wherein transitions between views occurs in a sliding manner or a pop-up manner.

12. The communication device of claim 1, wherein the exceptions handling area displays the plurality of service errors as stacked windows.

13. The communication device of claim 1, wherein the exceptions handling area displays the plurality of service errors as cascaded windows.

14. A method, comprising:
receiving a plurality of service errors impacting the operation of a communication device;
displaying a service error notification of the plurality of service errors on a user interface of the communication device;
displaying, by the user interface, an exceptions handling area, wherein the exceptions handling area lists the plurality of service errors received in priority order; and
receiving, at the communication device, a user input selecting the service error for resolution; and
wherein the priority order is determined by at least one of service type or solution.

15. The method of claim 14, wherein the service error notification comes in the form of an error notification icon located on a top bar of the user interface.

16. The method of claim 14, wherein the exceptions handling area presents the plurality of service errors based on a single service or a multi-service view, wherein the multi-service view displays the plurality of service errors from two or more services.

17. The method of claim 14, wherein in selecting the service error for resolution further includes presenting a first solution, wherein if the first solution does not resolve the service error, presenting a second solution.

18. The method of claim 17, wherein the second solution presented is an escalated solution as compared to the first solution and wherein the solutions presented and recovery steps are stored in a data structure within the communication device.

19. A system comprising:
means for receiving plurality of service errors impacting the operation of the communication device;
means for displaying a service error notification of the plurality of service errors received on a user interface;
means for retrieving the plurality of service errors, wherein the plurality of service errors are retrieved by input on the service error notification;
means for displaying, by the user interface, an exceptions handling area, wherein the exceptions handling area lists the plurality of service errors received in priority order; and
means for receiving user input selecting the service error for resolution; and
wherein the priority order is determined by at least one of service type or solution.

20. The system of clam 19, wherein if the plurality of service errors share a root cause, the multi-service view displays a single consolidated service error.

* * * * *